United States Patent
Hua

(10) Patent No.: US 6,583,993 B2
(45) Date of Patent: Jun. 24, 2003

(54) SELF-DRIVEN SYNCHRONOUS RECTIFICATION SCHEME FOR WIDE OUTPUT RANGE

(75) Inventor: Guichao Hua, Hangzhou (CN)

(73) Assignee: Bel Fuse, Inc., Jersey City, NJ (US)

( * ) Notice: Subject to any disclaimer, the term of this patent is extended or adjusted under 35 U.S.C. 154(b) by 0 days.

(21) Appl. No.: 09/932,398

(22) Filed: Aug. 17, 2001

(65) Prior Publication Data

US 2002/0044470 A1 Apr. 18, 2002

(51) Int. Cl.[7] .............................................. H02M 3/335
(52) U.S. Cl. ..................... 363/21.06; 363/127
(58) Field of Search ................ 363/17, 21.06, 363/21.14, 89, 127

(56) References Cited

U.S. PATENT DOCUMENTS

| | | | | |
|---|---|---|---|---|
| 4,519,024 A | * | 5/1985 | Federico et al. | 363/127 |
| 4,716,514 A | * | 12/1987 | Patel | 363/89 |
| 5,038,266 A | * | 8/1991 | Callen et al. | 363/127 |
| 5,274,543 A | * | 12/1993 | Loftus | 363/17 |
| 5,663,877 A | * | 9/1997 | Dittli et al. | 363/17 |
| 5,734,563 A | * | 3/1998 | Shinada | 363/127 |
| 6,011,703 A | * | 1/2000 | Boylan et al. | 363/21 |
| 6,104,623 A | * | 8/2000 | Rozman | 363/89 |
| 6,169,675 B1 | * | 1/2001 | Shimamori et al. | 363/89 |
| 6,275,401 B1 | * | 8/2001 | Xia | 363/127 |
| 6,301,139 B1 | * | 10/2001 | Patel | 363/21.06 |

* cited by examiner

*Primary Examiner*—Jeffrey Sterrett
(74) *Attorney, Agent, or Firm*—Ostrolenk, Faber, Gerb & Soffen, LLP

(57) ABSTRACT

A self-driven synchronous rectification circuit which includes two power switches $S_1$ and $S_2$; a transformer Tr having a primary winding with $N_p$ number of turns, a secondary winding with $N_s$ number of turns and an auxiliary winding with $N_a$ number of turns; two secondary synchronous rectifiers $S_3$ and $S_4$; two diodes $D_1$ and $D_2$; and two zener diodes $ZD_1$ and $ZD_2$. The number of auxiliary winding turns $N_a$ of the transformer Tr ensure that the synchronous rectifiers $S_3$ and $S_4$ are supplied with an adequate gate-drive voltage. When $S_3$ conducts, the gate-drive voltage of $S_4$ is clamped by $D_1$. Likewise, when $S_4$ conducts, the gate-drive voltage of $S_3$ is clamped by $D_2$. $ZD_1$ and $ZD_2$ operate to restrain the gate overvoltage of $S_3$ and $S_4$, respectively. With this design, the self-driven synchronous rectifier circuit operates normally at various output voltages, such as low output voltages of 3.3V or lower and/or high output voltages above 6V.

16 Claims, 5 Drawing Sheets

SELF-DRIVEN SYNCHRONOUS RECTIFICATION SCHEME FOR WIDE OUTPUT RANGE

BACKGROUND OF THE INVENTION

The present invention relates to a logic integrated circuit. In particular, the present invention relates to a self-driven, synchronous rectification scheme for a power converter which is easily adapted to various circuit topologies.

There is an ever-increasing demand in the power electronics market for low voltage and high current DC—DC converters. As output voltage is desired to be 3.3V or lower, even a state-of-the-art schottky diode with a forward voltage drop of 0.3V has an unacceptable amount of power loss.

Because of this, synchronous rectifiers are often used to improve the efficiency of DC—DC converters. Generally, there are two types of synchronous rectifiers, self-driven and externally driven. Since the self-driven mode is usually less complex, less costly and more reliable, it is preferred for use with most low voltage DC—DC converter applications.

FIG. 1A illustrates a conventional self-driven synchronous rectification, asymmetrical, zero voltage switching (ZVS) half-bridge (HB) topology. Although this circuit is very simple, it is only suitable for applications where the output voltage is in the range of from about 3.3V to 6V. Referring to FIG. 1B, the gate-drive voltages $V_{gs3}$ and $V_{gs4}$ of synchronous rectifiers $S_3$ and $S_4$, respectively, are as follows:

$$V_{gs3} = \frac{2N_s}{N_p}DV_{in} = \frac{2}{N}DV_{in} = \frac{V_0}{1-D} \quad (t_0 \le t \le t_1) \tag{1}$$

$$V_{gs4} = \frac{2N_s}{N_p}(1-D)V_{in} = \frac{2(1-D)}{N}V_{in} = \frac{V_0}{D} \quad (t_1 \le t \le t_2) \tag{2}$$

wherein, $V_{in}$ is the input voltage; $V_o$ is the output voltage; D is the steady-state duty cycle; $N_p$ is the number of primary winding turns of the transformer; $N_s$ is the number of secondary turns of the transformer; and N is the turns ratio of the transformer. The turns ratio of the transformer TR is calculated by dividing the number of primary windings by the number of secondary windings (i.e. $N=N_p/N_s$).

FIG. 1B illustrates the switching waveform occurring in the converter illustrated in FIG. 1A. As shown in FIG. 1B, the gate-drive voltage $V_{gs4}$ of $S_4$ is always higher than the gate-drive voltage $V_{gs3}$ of $S_3$ if D is less than 50%. If we assume that the minimum steady-state duty cycle D at heavy load is 30%, then $V_{gs3}$ is about 1.4V, and $V_{gs4}$ is about 3.3V. Since most synchronous rectifiers (including logic level devices) only work well with the gate-drive voltage between about 4V and 20V, the circuit shown in FIG. 1A only works well when the output voltage $V_O$ is between 2.9V to 6V. If the output voltage is below 2.9V, $S_3$ would be under driven. If the output voltage were about 6V, then $S_4$ would be over driven. In either case the synchronous rectifiers are easily rendered inoperative.

Accordingly, there remains a need for a self-driven synchronous rectifier which operates normally at various output voltages, such as low output voltages of 2.9V or lower and/or high output voltages above 6V.

SUMMARY OF THE INVENTION

The self-driven synchronous rectification circuit of the present invention includes two power switches $S_1$ and $S_2$; a transformer Tr having a primary winding with $N_p$ number of turns, a secondary winding with $N_s$ number of turns and an auxiliary winding with $N_a$ number of turns; two secondary synchronous rectifiers $S_3$ and $S_4$; two diodes $D_1$ and $D_2$; and two zener diodes $ZD_1$ and $ZD_2$.

The number of auxiliary winding turns $N_a$ of the transformer Tr ensure that the synchronous rectifiers $S_3$ and $S_4$ are supplied with an adequate gate-drive voltage. The selection of the number of auxiliary winding turns for use is determined according to the output voltage required. In the circuit of the present invention, when $S_3$ conducts, the gate-drive voltage of $S_4$ is clamped by $D_1$. Also, when $S_4$ conducts, the gate-drive voltage of $S_3$ is clamped by $D_2$. In other words, $D_1$ and $D_2$ prevent $S_3$ and $S_4$ from conducting at the same time. $ZD_1$ and $ZD_2$ restrain the gate overvoltage of $S_3$ and $S_4$, respectively.

With the above circuit configuration, a self-driven synchronous rectification scheme can be implemented which operates normally at various output voltages, such as low output voltages of 2.9V or lower and/or high output voltages above 6V.

BRIEF DESCRIPTION OF THE DRAWINGS

Other features and advantages of the present invention will become apparent from the following description of the invention which refers to the accompanying drawings, wherein.

DETAILED DESCRIPTION OF EMBODIMENTS OF THE INVENTION

Figure 1A:
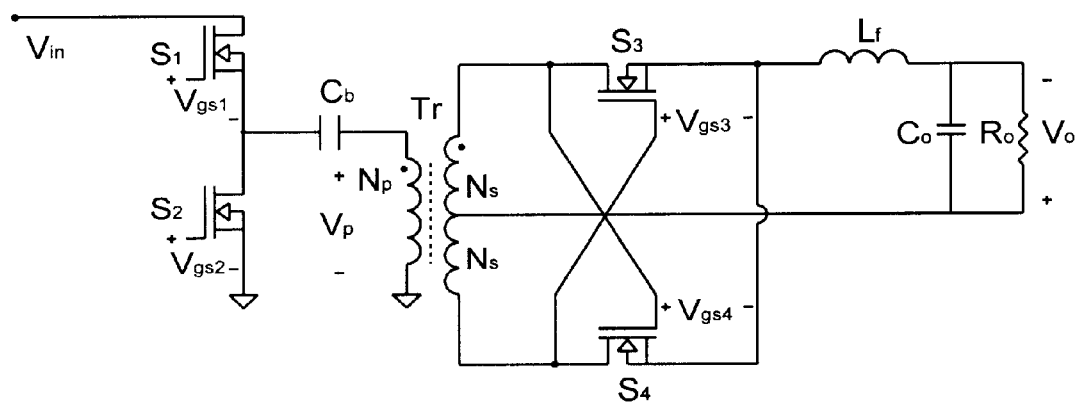
FIG. 1A is a circuit diagram of conventional self-driven synchronous rectification, asymmetrical ZVS HB converter.
Figure 1B:
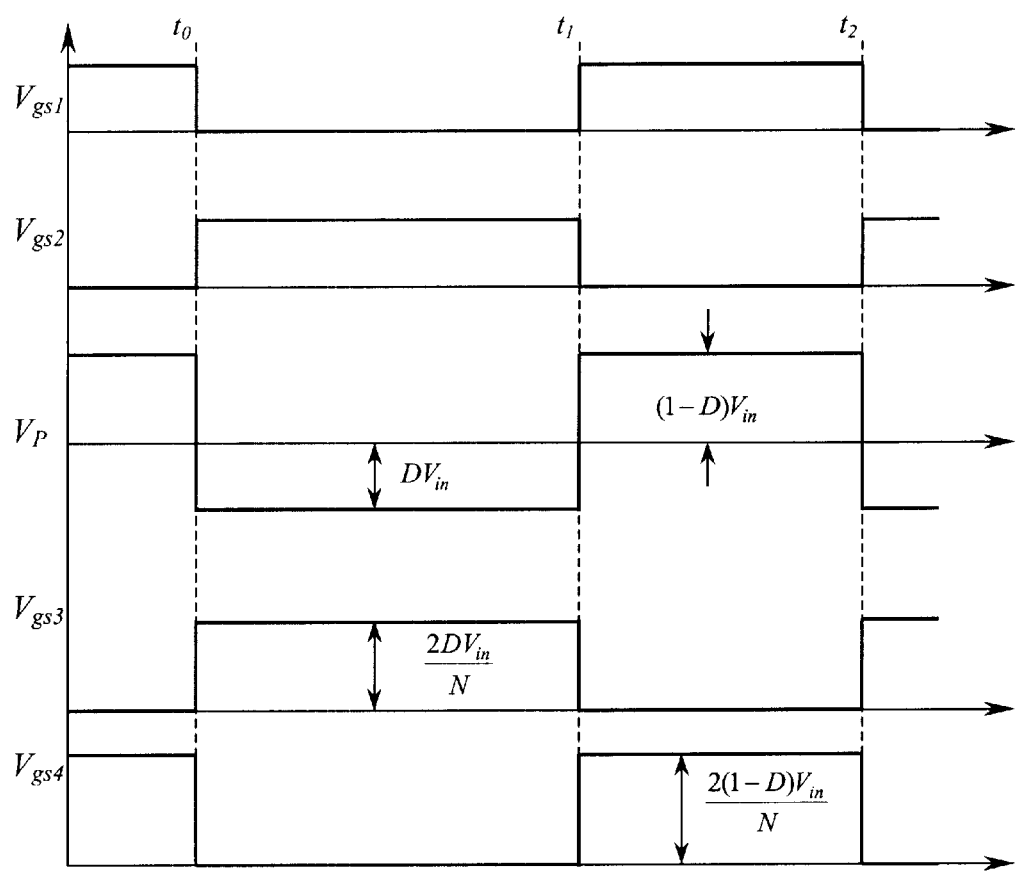
FIG. 1B illustrates the switching waveform occurring in the converter illustrated in FIG. 1A.
Figure 2A:
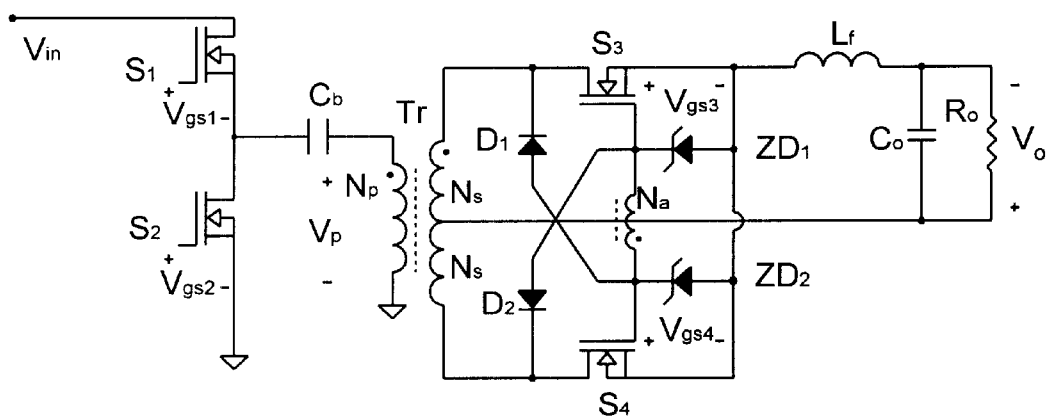
FIG. 2A is a circuit diagram of an asymmetrical ZVS HB converter which incorporates a self-driven synchronous rectifier circuit in accordance with the present invention.

Referring now to the drawings, FIG. 2A shows a circuit diagram of an asymmetrical ZVS HB converter incorporating the self-driven synchronous rectifier circuit of the present invention. The self-driven synchronous rectifier circuit of the present invention includes two power switches $S_1$ and $S_2$; a transformer Tr having a primary winding with $N_p$ number of turns, a secondary winding with $N_s$ number of turns and an auxiliary winding with $N_a$ number of turns; two secondary synchronous rectifiers $S_3$ and $S_4$; two diodes $D_1$ and $D_2$; and two zener diodes $ZD_1$ and $ZD_2$.

The number of auxiliary winding turns $N_a$ of the transformer Tr ensure that the synchronous rectifiers $S_3$ and $S_4$ are supplied with an adequate gate-drive voltage. The selection of the number of auxiliary winding turns for use is determined according to the output voltage required. Such a determination will be evident to one of ordinary skill in the art, and will depend upon, for example, the wire size chosen and the inductance required of the winding. In the circuit of the present invention, when $S_3$ conducts, the gate-drive voltage of $S_4$ is clamped by $D_1$. Also, when $S_4$ conducts, the gate-drive voltage of $S_3$ is clamped by $D_2$. In other words, $D_1$ and $D_2$ prevent $S_3$ and $S_4$ from conducting at the same time. $ZD_1$ and $ZD_2$ operate to restrain the gate overvoltage of $S_3$ and $S_4$, respectively. Because of this circuit configuration, the self-driven synchronous rectifier circuit operates normally at various output voltages, such as low output voltages of 2.9V or lower and/or high output voltages above 6V.

Figure 2B:
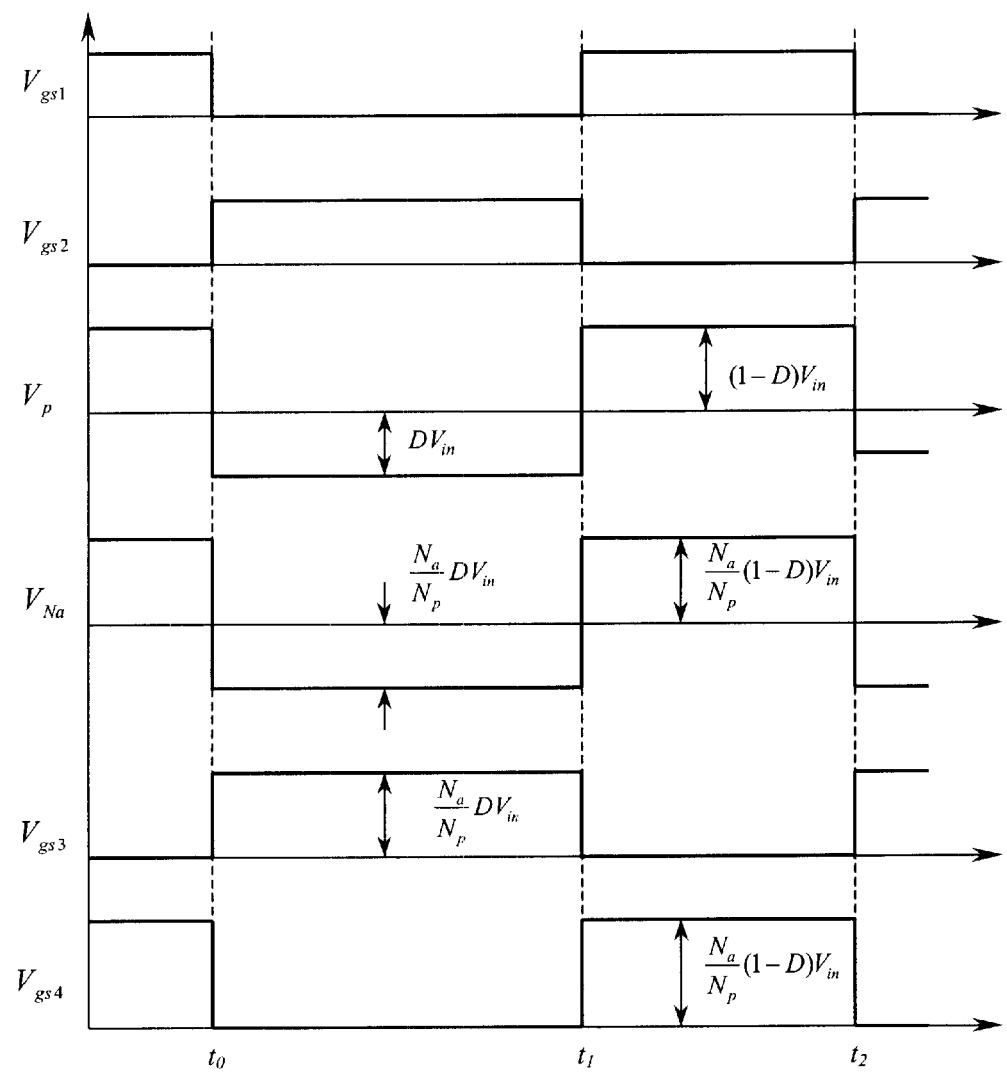
FIG. 2B illustrates the switching waveform occurring in the converter of FIG. 2A.

FIG. 2B illustrates the switching waveform of the converter shown in FIG. 2A. $V_{gs1}$, and $V_{gs2}$ represent the gate voltage waveforms of the two power switches $S_1$ and $S_2$. VP is the primary voltage waveform of transformer Tr. $V_{Na}$ is the voltage waveform of the auxiliary winding. $V_{gs3}$ and $V_{gs4}$ represent the gate voltage waveforms of the two synchronous rectifiers $S_3$ and $S_4$. $V_{gs3}$ and $V_{gs4}$ are calculated as follows:

$$V_{gs3} = \frac{N_a}{N_p} DV_{in} \quad (t_0 \leq t \leq t_1) \tag{3}$$

$$V_{gs4} = \frac{N_a}{N_p} (1-D) V_{in} \quad (t_1 \leq t \leq t_2) \tag{4}$$

wherein, D is the on-time of switch $S_1$ in percent duty cycle; 1-D is the on-time of switch $S_2$ in percent duty cycle; $N_p$ is the number of primary winding turns of transformer Tr; $N_a$ is the number of auxiliary winding turns of the transformer Tr; and $V_{in}$ is the input voltage.

Comparing equations (3) and (4) above with equations (1) and (2), it can be seen that, while the input voltage $V_{in}$, the duty cycle D and the primary and secondary turns of the transformer ($N_p$, $N_s$) are determined, the gate voltage of self-driven synchronous rectifiers $S_3$ and $S_4$ is adjusted by selecting the number of auxiliary winding turns $N_a$ of transformer Tr. This selection of the number of auxiliary winding turns $N_a$ ensures a reasonable gate-drive voltage for the synchronous rectifiers $S_3$ and $S_4$ even when the output voltage is lower than 2.9V or higher than 6V.

The principle of operation is as follows. Referring to FIG. 2B, during time $t_0$–$t_1$, $S_2$ and $S_3$ are on, and $S_1$ and $S_4$ are off. The primary voltage of transformer Tr is $DV_{in}$. Accordingly, the voltage of the auxiliary winding $V_{Na}$, namely the gate-drive voltage $V_{gs3}$ of $S_3$ is as follows:

$$\frac{N_a}{N_p} DV_{in}$$

When $S_3$ is on, the gate-drive voltage $V_{gs4}$ of $S_4$ is clamped to zero through the diode $D_1$ so as to prevent $S_3$ and $S_4$ from conducting at the same time. At time $t_1$, $S_2$ is turned off and $S_1$ is turned on. When $S_1$ is turned on, the voltage of the primary winding $N_p$ of transformer $T_r$ reverses and the voltages of the secondary winding $N_s$ and auxiliary winding $N_a$ also reverse. When the voltages of the windings reverse, $S_4$ is turned on and $S_3$ is turned off. During this interval, the gate-drive voltage $V_{gs4}$ of $S_4$ is as follows:

$$\frac{N_a}{N_p} (1-D) V_{in}$$

When $S_4$ is on, the gate-drive voltage of $S_3$ is clamped to zero through the diode $D_2$ so as to prevent $S_3$ and $S_4$ from conducting at the same time. The function of $ZD_1$ and $ZD_2$ is to restrain the gate overvoltage of each of the synchronous rectifiers $S_3$ and $S_4$, respectively.

While the embodiment of the invention described above is presently preferred, many variations and modifications are possible depending on practical needs.

For example, the self-driven synchronous rectifier circuit of the present invention can be applied to a symmetrical HB converter. With the proper adjustments, which are well within the level of one of ordinary skill in the art given the present disclosure, the self-driven synchronous rectifier circuit can also be applied to a ZVS HB converter whose duty cycle is close to 50%.

Figure 3:
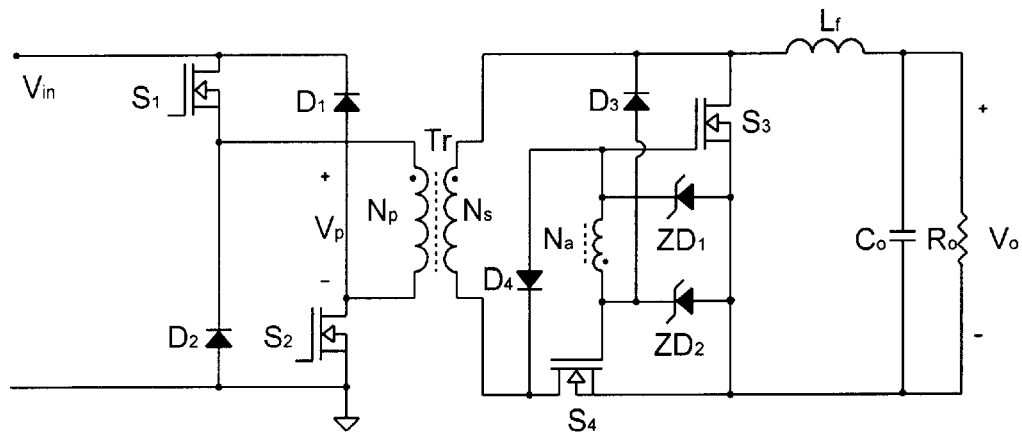
FIG. 3 is a circuit diagram showing the self-driven synchronous rectifier circuit of the present invention applied to a forward converter.
Figure 4:
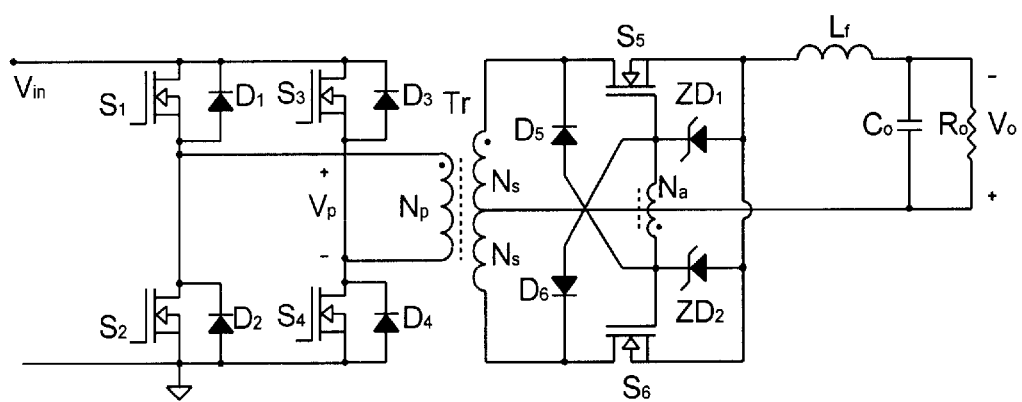
FIG. 4 is a circuit diagram showing the self-driven synchronous rectifier circuit of the present invention applied to a full-bridge converter.

In addition to an asymmetrical and a symmetrical HB converter, the self-driven synchronous rectifier circuit of the present invention can be applied to a forward converter, such as that shown in FIG. 3, and a full-bridge converter, such as that shown in FIG. 4.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A self-driven synchronous rectifier circuit, comprising:
   an input terminal for receiving a voltage;
   a first power switch electrically connected to the input terminal;
   a second power switch electrically connected to the input terminal;
   a transformer having a primary winding, a secondary winding and an independently coupled auxiliary winding, the primary winding being connected to the first power switch and the second power switch;
   a first synchronous rectifier connected to the first power switch via coupling between the primary and secondary windings of the transformer;
   a second synchronous rectifier connected to the second power switch via the coupling between the primary and secondary windings of the transformer;
   a first diode connected to the second synchronous rectifier; and
   a second diode connected to the first synchronous rectifier,
   wherein the auxiliary winding is connected to respective gates of the first and second synchronous rectifiers to ensure that the first and second synchronous rectifiers are supplied with an adequate gate drive voltage, and wherein the first and second diodes are operable to prevent the first and second synchronous rectifiers from conducting at the same time.

2. The self-driven synchronous rectifier circuit according to claim 1, wherein a gate drive voltage of the second synchronous rectifier is clamped by the first diode when the first synchronous rectifier conducts.

3. The self-driven synchronous rectifier circuit according to claim 2, wherein a gate drive voltage of the first synchronous rectifier is clamped by the second diode when the second synchronous rectifier conducts.

4. The self-driven synchronous rectifier circuit according to claim 1, wherein a voltage across the primary winding, a voltage across the secondary winding and a voltage across the auxiliary winding are reversed relative to the turning on of the first switch and the second switch.

5. The self-driven synchronous rectifier circuit according to claim 1, wherein the gate voltages of the first synchronous rectifier and the second synchronous rectifier are set by predetermining the number of turns of the auxiliary winding.

6. A self-driven synchronous rectifier circuit, comprising:
an input terminal for receiving a voltage;
a first power switch electrically connected to the input terminal;
a second power switch electrically connected to the input terminal;
a transformer connected to the first power switch and the second power switch, the transformer including a primary winding, a secondary winding and an auxiliary winding;
a first synchronous rectifier connected to the first power switch via the transformer;
a second synchronous rectifier connected to the second power switch via the transformer;
a first diode connected to the second synchronous rectifier; and
a second diode connected to the first synchronous rectifier, wherein the first and second diodes are operable to prevent the first and second synchronous rectifiers from conducting at the same time;
a third diode connected to the second synchronous rectifier; and
a fourth diode connected to the first synchronous rectifier, the third diode operating to restrain gate overvoltage of the first synchronous rectifier, the fourth diode operating to restrain gate overvoltage of the second synchronous rectifier.

7. The self-driven synchronous rectifier circuit according to claim 6, wherein the third and fourth diodes are zener diodes.

8. A method of self-driving a synchronous rectifier circuit, the method comprising:
   A. during a first part of a cycle:
      (1) turning a first synchronous rectifier on;
      (2) turning a second synchronous rectifier off such that the first and second synchronous rectifiers do not conduct at the same time,
   B. during a second part of the cycle:
      (3) turning on the second synchronous rectifier;
      (4) turning off the first synchronous rectifier such that the first and second synchronous rectifiers do not conduct at the same time;
      (5) reversing a voltage across a transformer in response to the turning on and turning off of the first and second synchronous rectifiers; and
   restraining gate overvoltage of the first and second synchronous rectifiers.

9. The method of self-driving a synchronous rectifier circuit according to claim 8, wherein the gate overvoltage of the first synchronous rectifier is restrained by a first zener diode.

10. The method of self-driving a synchronous rectifier circuit according to claim 9, wherein the gate overvoltage of the second synchronous rectifier is restrained by a second zener diode.

11. A method of self-driving a synchronous rectifier circuit having a transformer with a primary winding, a secondary winding, and an independently coupled auxiliary winding, the method comprising:
   during a first part of a cycle:
      (1) turning a first synchronous rectifier on by applying a gate voltage thereto via the auxiliary winding;
      (2) turning a second synchronous rectifier off such that the first and second synchronous rectifiers do not conduct at the same time,
   during a second part of the cycle:
      (3) turning on the second synchronous rectifier by applying a gate voltage thereto via the auxiliary winding;
      (4) turning off the first synchronous rectifier such that the first and second synchronous rectifiers do not conduct at the same time; and
      (5) reversing a voltage across the secondary of the transformer transformer in response to reversal of the voltage across the primary of the transform to effect the turning on and turning off of the first and second synchronous rectifiers.

12. The method of self-driving a synchronous rectifier circuit according to claim 11, wherein the second synchronous rectifier is turned off by clamping the second synchronous rectifier's gate drive voltage to zero.

13. The method of self-driving a synchronous rectifier circuit according to claim 12, wherein the gate drive voltage is clamped to zero using a diode.

14. The method of self-driving a synchronous rectifier circuit according to claim 11, wherein the first synchronous rectifier is turned off by clamping the first synchronous rectifier's gate drive voltage to zero.

15. The method of self-driving a synchronous rectifier circuit according to claim 14, wherein the gate drive voltage is clamped to zero using a diode.

16. The method of self-driving a synchronous rectifier circuit according to claim 11, wherein the gate voltages of the first and second synchronous rectifiers are set by predetermining the number of turns of the auxiliary winding of the transformer.

* * * * *